2,880,181
BINDER FOR CONDUCTIVE METALLIC FILM

Warren D. Williams, Copiague, N.Y., assignor to Sperry Rand Corporation, a corporation of Delaware No Drawing. Application November 2, 1956
Serial No. 619,950

4 Claims. (Cl. 252—514)

This invention relates to a novel composition of matter and more particularly to a material employed for providing coatings conductive to microwaves on the surfaces of plastic structures.

In the field of microwaves it is desirable to provide plastic wave guiding structures and plastic multicellular lenses. Such devices must have metallized coatings electrically conductive to microwaves on the interior surfaces of hollow plastic rigid or flexible tubes of rectangular or circular cross section. To be electrically conductive to microwaves, the metallic coatings must be of a metal having maximum conductivity and must be smooth, continuous, homogeneous, and free of irregularities and voids.

In a copending patent application Serial No. 624,880, by Klima and Niechniedowicz, and assigned to the same assignee as the instant invention, there is described a novel process for obtaining coatings conductive to microwaves on the interior surfaces of hollow plastic tubes. In this process a metallic suspension comprising thin silver flakes suspended in a suitable binder are applied to the exterior surfaces of a form or mandrel. The binder then hardens to form with the flakes a continuous conductive film conformal with the mandrel surfaces. The film is then immersed in a fluid plastic molding material. If the mandrel has been properly prepared and the materials judiciously selected, the hardened molding material adheres to the outside of the metallic film to a greater degree than the mandrel adheres to the inside of the film. The mandrel may then be removed from the completed structure, leaving a hollow tube having an interior surface conductive to microwaves.

In the process described it is desirable to provide a metallic film having a binding material which will interact with the fluid plastic molding material so that the molding material and binder harden to form a strong and intimate bond with the metallic film. However, it is necessary that such binding material maintain the silver flakes in alignment during the period of immersion by and subsequent hardening of the molding material in order to preserve the conductivity of the film.

It is therefore an object of this invention to provide a novel composition of matter useful for providing coatings conductive to microwaves on the surfaces of plastic structures.

It is a further object of this invention to provide a metallic film adapted to intimately bond with a plastic molding material.

It is a further object of this invention to provide a binder for a metallic film conductive to microwaves, the binder being adapted to maintain film conductivity while forming an intimate bond between the film and a plastic molding material.

These objects are realized in this invention by providing a metallic film, comprising thin metallic flakes in a dual function binder. This film is formed on the exterior surface of a form or mandrel. By proper selection of their size and shape, the flat surfaces of the metallic flakes will be aligned substantially parallel with the adjacent surfaces of the mandrel, forming a continuous conductive film conformal with the mandrel surfaces. The film is then immersed in a fluid plastic molding material. The dual function binder includes a primary binder which is relatively insoluble in the molding material and a secondary binder soluble in the molding material. Thus, the primary binder maintains the metallic film in alignment during the immersing and setting of the molding material. The hardened molding material which has dissolved a portion of the secondary binder forms an integral bond with the metallic film. The mandrel is then removed from the completed structure and does not injure the metallic film. The film then adheres to the plastic body as a conductive coating.

The metallic flakes employed should be relatively thin and of conductive materials such as silver, copper, gold, aluminum, or alloys of silver and of gold, etc. to obtain a conductive film. The dual function binder must include a constituent substantially insoluble in the molding material, known as the primary binder, and a constituent soluble in the molding material, known as the secondary binder. The molding material may be any resinous material, for example polyester resin. If the molding material is polyester resin, the binder may contain a mixture of nitrocellulose as the primary binder and cellulose acetate butyrate as the secondary binder.

As presently understood the method by which a conductive metallic film is originally obtained and retained despite its immersion in the molding material is as follows: The metallic particles are thin flakes of critical size and thickness. When they are deposited on the smooth surfaces of the mandrel, either by brushing, spraying, electrostatic precipitation, etc., the forces given the particles tend to orient them so that their flat surfaces are substantially in parallel alignment with the adjacent mandrel surfaces. The presence of a profusion of such particles in the original suspension causes an overlapping of the particles, all aligned substantially parallel to the adjacent mandrel surfaces. A thin continuous conductive film is then formed and retained in place as the binding material hardens. Any particle which originally was not deposited substantially parallel to the mandrel surface is in a state of unstable equilibrium, so that as the binder hardens, surface tension will force the particle to fall over and assume a position parallel to the mandrel surface.

When the film is immersed in the molding material, as by spraying, dipping, molding, brushing, etc., the silver particles would tend to become disarranged and assume random attitudes with respect to the mandrel surfaces were it not for the fact that the binding material contains the primary binder, which is substantially insoluble in the molding material. The primary binder maintains the conductive film intact as the molding material sets. Where the molding material is polyester resin the styrene therein dissolves the secondary binder so that when the resin polymerizes an intimate mechanical bond has been established between the conductive film and the hardened molding material.

It has been found that best results are achieved when (a) the metallic particles are silver flakes if the flakes have the following dimensions: a thickness in the range of 15–150 millimicrons and maximum flat surface dimensions in the range of 0.2–30 microns, and (b) the solid content of the binding vehicle of the metallic flake suspension is in the range of 3–25% by weight of the total vehicle. This solid content is the material actually holding the metallic film together after the fluid content of the binding vehicle has evaporated. If the solid content is greater than 25% of the binding vehicle, the individual metallic flakes become coated, thereby reducing physical contact between the flakes, and hence, the conductivity of the film. If the solid content is less than 3% of the binding vehicle, the strength of the film is too low and the metallic flakes tend to dust from the film.

In describing one form of employment of the invention, it will be assumed that it is desired to produce a conductive silver film on the inside surfaces of a hollow rectangular tube of polyester resin. Among the materials to be used in this process are the following:

Mandrel—an aluminum form whose shape conforms to the interior of the desired hollow rectangular tube. The mandrel may also be destructible and formed of a material such as wax. The mandrel should be rectangular in cross section, having extremely smooth surfaces. The degree of smoothness of the mandrel surfaces is a controlling factor in determining the smoothness of the metallic film, and hence, its conductivity. The mandrel may be slightly tapered along its length to facilitate removal from the completed structure.

Wax—a hard commercial wax, such as carnauba wax.

Separating agent—by weight 2% methyl cellulose, 49% methylene chloride, 49% methyl alcohol.

Metallic suspension—the binding vehicle is by weight 88.5% of a first solution, which in turn consists by weight of 13% nitrocellulose, the primary binder, in a solvent of one-half ethyl alcohol and one-half ethyl acetate; 10% of a second solution, which in turn consists by weight of 20% cellulose acetate butyrate, the secondary binder, in a solvent of one-half methyl ethyl ketone and one-half toluene; and 1.5% dioctyl phthalate, a plasticizer. The binding vehicle is mixed in equal parts by weight with silver flakes, which are selected from the dimensional range previously described. As previously pointed out, the solid content of the binding vehicle, that is, the nitrocellulose and the cellulose acetate butyrate, should comprise from 3–25% by weight of the binding vehicle. The relative proportions between the primary and secondary binding materials in the solid content is determined by the desired degree of penetration of the molding material into the metallic film, i.e., the strength of the bond between the film and the molding material. The proportions specified are those presently preferred.

Molding material—polyester resin dispersed in a monomer, such as styrene—by weight 75% polyester resin, 25% styrene. The dispersion includes catalyst, methyl ethyl ketone, and an accelerator, cobalt naphthenate.

First, a coat of wax is applied to the mandrel. It is the function of the wax to permit easy removal of the mandrel from the final structure.

The separating agent is next applied to the waxed surfaces of the mandrel. The separating agent is allowed to dry. It is the function of the separating layer to serve as a boundary for the metallic suspension which is to be employed next.

The metallic suspension is then sprayed onto the separating layer. Spray pressure is adjusted to apply a total film of .0001" to .0050" thickness uniformly onto the surfaces of the mandrel. The total thickness of the metallic film depends on the frequency of the microwaves to be employed, the lower the frequency, the greater the thickness desired. The resulting coat should be allowed to dry at room temperature for at least 24 hours.

The molding material is then sprayed or brushed onto the metallic film. This molding material interacts with the secondary binder to form the aforementioned intimate mechanical bond between the molding material and the metallic film, while the primary binder maintains the alignment of the flakes and thereby preserves the conductivity of the film.

The composition of the polyester resin employed as the molding material is determined by the viscosity desired during its application to the metallic film, the more styrene that is employed the less viscous is the resultant fluid.

A metallic film bonded to the surfaces of a plastic structure, as described in this invention does not peel or chip, is resistive to wear, and has excellent conductive properties for microwaves.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. A metallic suspension for immersion by an unsaturated polyester molding material subsequent to the coating and hardening of said suspension on the surface of a form, comprising thin silver flakes suspended in a vehicle comprising a primary binder substantially insoluble in said fluid molding material, said primary binder being a solution of nitrocellulose and equal parts of ethyl alcohol and ethyl acetate and a secondary binder substantially soluble in said fluid molding material, said secondary binder being a solution of cellulose acetate butyrate and equal parts of methyl ethyl ketone and toluene.

2. A metallic suspension for providing a film conductive to microwaves on the surface of a plastic structure, comprising silver flakes having a thickness in the range of 15–150 millimicrons and a maximum flat surface dimension in the range of 0.2–30 microns suspended in a vehicle having a solids content in the range of 3–25% of said vehicle and comprising 10–30% secondary binder, 1.5% plasticizer, and the remainder primary binder, said primary binder being substantially a 13% solution of nitrocellulose in equal parts of ethyl alcohol and ethyl acetate, said secondary binder being substantially a 20% solution of cellulose acetate butyrate in equal parts of methyl ethyl ketone and toluene, said plasticizer being dioctyl phthalate, and all of said percentages being expressed as parts by weight.

3. A binder for a metallic film to be intimately bonded to a plastic molding material, comprising a first material substantially insoluble in said molding material, a second material soluble in said molding material and a plasticizer to improve film forming characteristics, said first material being substantially a 13% solution of nitrocellulose in equal parts of ethyl alcohol and ethyl acetate solvents, said second material being substantially a 20% solution of cellulose acetate butyrate in equal parts of methyl ethyl ketone and toluene solvents, said plasticizer being dioctyl phthalate, and all of said percentages being expressed as parts by weight.

4. A metallic suspension for providing plastic structures with a surface conductive to microwaves, comprising silver flakes having a thickness in the range of 15–150 millimicrons and a maximum flat surface dimension in the range of 0.2–30 microns suspended in substantially an equal weight of a solution containing 3–25% by weight of a mixture of cellulose acetate butyrate and nitrocellulose.

References Cited in the file of this patent

UNITED STATES PATENTS

| | | |
|---|---|---|
| 2,256,642 | Gaut | Sept. 23, 1941 |
| 2,280,135 | Ward | Apr. 21, 1942 |
| 2,406,658 | Bogin | Aug. 27, 1946 |
| 2,444,034 | Collings | June 29, 1948 |